US009980117B2

(12) United States Patent
Hillan et al.

(10) Patent No.: US 9,980,117 B2
(45) Date of Patent: May 22, 2018

(54) METHODS AND APPARATUS FOR IMPROVING PEER COMMUNICATIONS USING AN ACTIVE COMMUNICATION MODE

(71) Applicant: QUALCOMM Incorporated, San Diego, CA (US)

(72) Inventors: John Hillan, Alton (GB); Anssi Kaleva Haverinen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/937,527

(22) Filed: Nov. 10, 2015

(65) Prior Publication Data

US 2016/0066132 A1   Mar. 3, 2016

Related U.S. Application Data

(62) Division of application No. 13/668,825, filed on Nov. 5, 2012, now Pat. No. 9,214,988.
(Continued)

(51) Int. Cl.
*H04B 7/00* (2006.01)
*H04B 5/02* (2006.01)
(Continued)

(52) U.S. Cl.
CPC ............... *H04W 4/80* (2018.02); *H04B 5/02* (2013.01); *H04W 52/0209* (2013.01);
(Continued)

(58) Field of Classification Search
CPC .... H04B 5/02; H04W 4/008; H04W 52/0209; H04W 74/0816; H04W 76/023;
(Continued)

(56) References Cited

U.S. PATENT DOCUMENTS 8,503,931 B2    8/2013  Wilson
2005/0077356 A1   4/2005  Takayama et al.
(Continued)

FOREIGN PATENT DOCUMENTS

CN    101263732 A    9/2008
CN    101951281 A    1/2011
(Continued)

OTHER PUBLICATIONS

ECMA International: "Near Field Communication; White paper", Internet Citation, Oct. 11, 2004 (Oct. 11, 2004), 8 pages, XP002392097, Retrieved from the Internet: URL:http:jjweb.archive.orgjweb/20041011051854/www.ecma-international.orgjactivities/ index.html, [retrieved on Jul. 26, 2006] p. 7, paragraph 3.
(Continued)

*Primary Examiner* — Xin Jia
(74) *Attorney, Agent, or Firm* — Arent Fox, LLP

(57) ABSTRACT

Aspects disclosed herein relate to providing peer communications between NFC enabled devices using an active communication mode. In one example, a communications device is equipped to detect a remote NFC device field within an operating volume, establish a peer communication link with the remote NFC device using an active communication mode, determine that the peer communication link is to be deselected, and transmit a deselection request message to the remote NFC device indicating to the remote NFC device that it has been deselected while maintaining the peer communication link. In another example, a communications device is equipped to sense an operating volume, as part of an active communication mode collision avoidance procedure, determine that no field is sensed, initiate an unmodulated carrier as part of switching an
(Continued)

operating field to an on state, and maintain the unmodulated carrier for a collision avoidance threshold duration of time.

28 Claims, 9 Drawing Sheets

Related U.S. Application Data

(60) Provisional application No. 61/669,310, filed on Jul. 9, 2012, provisional application No. 61/595,496, filed on Feb. 6, 2012.

(51) Int. Cl.
    *H04W 74/08* (2009.01)
    *H04W 52/02* (2009.01)

(52) U.S. Cl.
    CPC ....... *H04W 74/0816* (2013.01); *H04W 76/14* (2018.02); *H04W 76/23* (2018.02); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/166* (2018.01); *Y02D 70/22* (2018.01); *Y02D 70/42* (2018.01)

(58) Field of Classification Search
    CPC ............. H04W 76/043; Y02D 70/1262; Y02D 70/1222; Y02D 70/166; Y02D 70/1242; Y02D 70/1224; Y02D 70/142; Y02D 70/144; Y02D 70/146; Y02D 70/22; Y02D 70/162; Y02D 70/00
    See application file for complete search history.

(56) References Cited

U.S. PATENT DOCUMENTS

| | | |
|---|---|---|
| 2007/0274242 A1 | 11/2007 | Lamacraft et al. |
| 2008/0090603 A1 | 4/2008 | Breitfuss et al. |
| 2008/0137862 A1 | 6/2008 | Morita et al. |
| 2008/0291852 A1 | 11/2008 | Abel |
| 2008/0299907 A1 | 12/2008 | Takayama |
| 2008/0309490 A1 | 12/2008 | Honkanen et al. |
| 2010/0068999 A1 | 3/2010 | Bangs et al. |
| 2010/0093429 A1* | 4/2010 | Mattice ............... G07F 1/06 463/25 |
| 2010/0130127 A1* | 5/2010 | Takayama ............ H04B 5/02 455/41.1 |
| 2010/0190436 A1 | 7/2010 | Cook et al. |
| 2010/0248710 A1 | 9/2010 | Sklovsky et al. |
| 2011/0044396 A1* | 2/2011 | Fujii ............... H04L 27/02 375/268 |
| 2011/0059694 A1 | 3/2011 | Audic et al. |
| 2011/0282785 A1* | 11/2011 | Chin ............... G06F 3/04883 705/42 |
| 2011/0320612 A1 | 12/2011 | Oka et al. |
| 2012/0045989 A1* | 2/2012 | Suumaki ............ H04W 8/005 455/41.1 |
| 2012/0300860 A1 | 11/2012 | Washiro |
| 2012/0316953 A1 | 12/2012 | Ramchandani et al. |
| 2013/0005242 A1 | 1/2013 | Royston |
| 2013/0063255 A1 | 3/2013 | Washiro |
| 2013/0137370 A1 | 5/2013 | Haverinen |
| 2013/0203349 A1 | 8/2013 | Hillan et al. |
| 2013/0211606 A1 | 8/2013 | Takemura et al. |
| 2013/0211607 A1 | 8/2013 | Takemura et al. |
| 2013/0212643 A1 | 8/2013 | Takemura et al. |
| 2014/0021799 A1 | 1/2014 | Sankararamalingam et al. |
| 2014/0080414 A1 | 3/2014 | Gopalan et al. |
| 2015/0011161 A1 | 1/2015 | Dhayni |

FOREIGN PATENT DOCUMENTS

| | | |
|---|---|---|
| EP | 2192810 A2 | 6/2010 |
| JP | 2004215225 A | 7/2004 |
| JP | 2009-278389 A | 11/2009 |
| WO | 2008117915 A1 | 10/2008 |
| WO | 2010064235 A1 | 6/2010 |

OTHER PUBLICATIONS

"Information technology Telecommunications and information exchange between systems Near Field Communication Interface and Protocol (NFCIP-1)", Technologies de l'information Telecommunications et e'change d'information entire systemes Communication de champ proche Interface et 37-42, protocole (NFCIP-1), International Standard ISO/IEC, XX, XX, vol. 18092, No. 1st edition, Apr. 1, 2004 (Apr. 1, 2004), p. 66PP, XP007905654, p. 6-p. 12, p. 34-p. 36.
International Search Report and Written Opinion—PCT/US2013/024876—ISA/EPO—dated Sep. 10, 2013.
Partial International Search Report—PCT/US2013/024876—ISA/EPO—dated Jul. 11, 2013.
European Search Report—EP15190412—Search Authority—Munich—dated Nov. 30, 2015.
ECMA: "Near Field Communication—Interface and Protocol (NFCIP-1)", Standard ECMA-340, Jun. 2013, 52 Pages, 3rd Edition.

* cited by examiner

METHODS AND APPARATUS FOR IMPROVING PEER COMMUNICATIONS USING AN ACTIVE COMMUNICATION MODE

CLAIM OF PRIORITY UNDER 35 U.S.C. § 120

The present application for patent is a divisional of U.S. patent application Ser. No. 13/668,825, entitled "METHODS AND APPARATUS FOR IMPROVING PEER COMMUNICATIONS USING AN ACTIVE COMMUNICATION MODE" filed Nov. 5, 2012, which claims the benefit of and priority to Provisional Application No. 61/595,496 entitled "METHODS AND APPARATUS FOR IMPROVING PEER COMMUNICATIONS USING AN ACTIVE COMMUNICATION MODE" filed Feb. 6, 2012, and Provisional Application No. 61/669,310 entitled "METHODS AND APPARATUS FOR IMPROVING PEER COMMUNICATIONS USING AN ACTIVE COMMUNICATION MODE" filed Jul. 9, 2012. The aforementioned applications are assigned to the assignee hereof and hereby expressly incorporated by reference herein.

BACKGROUND

The disclosed aspects relate generally to communications between and/or within devices and specifically to methods and systems for improving peer communications through use of an active communication mode.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, near field communication (NFC), etc.

NFC enabled devices may operation in a polling mode and/or a listening mode. When operating in a polling mode a device generates an RF carrier that can supply energy to a remote device. The polling device may modulate the RF carrier appropriately in order to begin communication with the remote device. When operating in a listening mode a device does not generate any RF carrier, but when exposed to a carrier from a remote device, the device may harvest energy from the field, and decode the incoming modulation to begin communication. Once communications have been established, the peer devices remain fixed in their respective polling or listening modes. Such communications are referred to as passive communications (e.g., ISO 18092 Passive Communication).

Version 1.0 of the NFC Forum "Digital Protocol" specification includes only the Passive Communication Mode as defined in ISO/IEC 18092. Whilst this does allow the operation of NFC-DEP protocol, it has distinct problems for implementation in handheld NFC devices. Firstly, because in Passive Communication Mode, the carrier must remain on continuously, a large amount of power may be wasted while the two devices are processing the information exchanged between them even if there is no content actually be communicated. Secondly, the power consumption is not shared evenly between the two devices. One will be generating a field all the time, and the other will only use load modulation to respond to commands. Thirdly, Passive Communication Mode has limitations in features such as a limitation on data rate to 424 kbps and lower, and inability to perform multi-activation Thus, improved apparatus and methods for providing peer communications between NFC enabled device using active mode communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing peer communications between NFC enabled devices using an active communication mode. In one example, a communications device is equipped to detect a field generated by a remote NFC device within an operating volume of an NFC device, establish a peer communication link with the remote NFC device using an active communication mode, determine that the peer communication link with the remote NFC device is to be deselected, and transmit a deselection request message to the remote NFC device indicating to the remote NFC device that it has been deselected while maintaining the peer communication link. In another example, a communications device is equipped to receive a deselection request message from a remote NFC device that has established an active communication mode per communication link with the device, and change the peer communication link to an asleep status while maintaining the peer communication link. In such an aspect, the asleep status may prohibit communications between the device and the remote NFC device. In still another example, a communications device is equipped to sense an operating volume, as part of an active communication mode collision avoidance procedure, for a presence of a field generated by a remote NFC device, determine that no field is sensed, initiate an unmodulated carrier as part of switching an operating field to an on state, and maintain the unmodulated carrier for a collision avoidance threshold duration of time.

According to related aspects, a method for using an active communication mode to support communications between NFC devices is provided. The method can include sensing an operating volume for a presence of a field generated by a remote NFC device as part of an active communication mode collision avoidance procedure. Further, the method can include determining that no field is sensed within the operating volume of an NFC device. Further, the method can include initiating an unmodulated carrier as part of switching an operating field for the NFC device to an on state. Moreover, the method may include maintaining the unmodulated carrier for a collision avoidance threshold duration of time.

Another aspect relates to a communications apparatus enabled to use an active communication mode to support communications between NFC devices. The communications apparatus can include means for sensing an operating volume for a presence of a field generated by a remote NFC device as part of an active communication mode collision avoidance procedure. Further, the communications apparatus can include means for determining that no field is sensed within the operating volume of an NFC device. Further, the communications apparatus can include means for initiating an unmodulated carrier as part of switching an operating field for the NFC device to an on state. Moreover, the communications apparatus can include means for maintaining the unmodulated carrier for a collision avoidance threshold duration of time.

Another aspect relates to a communications apparatus. The apparatus can include a transceiver, a memory, a processor coupled to the memory, and an active communication mode module coupled to at least one of the memory or processor. The active communication mode module may be configured to sense an operating volume for a presence of a field generated by a remote NFC device as part of an active communication mode collision avoidance procedure. Further, the active communication mode module may be configured to determine that no field is sensed within the operating volume of an NFC device. Further, the active communication mode module may be configured to initiate an unmodulated carrier as part of switching an operating field for the NFC device to an on state. Moreover, the active communication mode module may further be configured to maintain the unmodulated carrier for a collision avoidance threshold duration of time.

Still another aspect relates to a computer program product, which can have a computer-readable medium including code for sensing an operating volume for a presence of a field generated by a remote NFC device as part of an active communication mode collision avoidance procedure. Further, the computer-readable medium may include code for determining that no field is sensed within the operating volume of an NFC device. Further, the computer-readable medium may include code for initiating an unmodulated carrier as part of switching an operating field for the NFC device to an on state. Moreover, the computer-readable medium can include code for maintaining the unmodulated carrier for a collision avoidance threshold duration of time.

According to related aspects, a method for using an active communication mode to support communications between NFC devices is provided. The method can include detecting a field generated by a remote NFC device within an operating volume of an NFC device. Further, the method can include establishing a peer communication link with the remote NFC device using an active communication mode. Further, the method can include determining that the peer communication link with the remote NFC device is to be deselected. Moreover, the method may include transmitting a deselection request message to the remote NFC device indicating to the remote NFC device that it has been deselected while maintaining the peer communication link.

Another aspect relates to a communications apparatus enabled to using an active communication mode to support communications between NFC devices. The communications apparatus can include means for detecting a field generated by a remote NFC device within an operating volume of an NFC device. Further, the communications apparatus can include means for establishing a peer communication link with the remote NFC device using an active communication mode. Further, the communications apparatus can include means for determining that the peer communication link with the remote NFC device is to be deselected. Moreover, the communications apparatus can include means for transmitting a deselection request message to the remote NFC device indicating to the remote NFC device that it has been deselected while maintaining the peer communication link.

Another aspect relates to a communications apparatus. The apparatus can include a transceiver, a memory, a processor coupled to the memory, and an active communication mode module coupled to at least one of the memory or processor. The active communication mode module may be configured to detect a field generated by a remote NFC device within an operating volume of an NFC device. Further, the active communication mode module may be configured to establish a peer communication link with the remote NFC device using an active communication mode. Further, the active communication mode module may be configured to determine that the peer communication link with the remote NFC device is to be deselected. Moreover, the active communication mode module may further be configured to transmit a deselection request message to the remote NFC device indicating to the remote NFC device that it has been deselected while maintaining the peer communication link.

Still another aspect relates to a computer program product, which can have a computer-readable medium including code for detecting a field generated by a remote NFC device within an operating volume of an NFC device. Further, the computer-readable medium may include code for establishing a peer communication link with the remote NFC device using an active communication mode. Further, the computer-readable medium may include code for determining that the peer communication link with the remote NFC device is to be deselected. Moreover, the computer-readable medium can include code for transmitting a deselection request message to the remote NFC device indicating to the remote NFC device that it has been deselected while maintaining the peer communication link.

According to related aspects, a method for using an active communication mode to support communications between NFC devices is provided. The method can include receiving a deselection request message from a remote NFC device that has established an active communication mode per communication link with a NFC device. Moreover, the method may include changing the peer communication link to an asleep status while maintaining the peer communication link. In an aspect, the asleep status may prohibit communications between the NFC device and the remote NFC device.

Another aspect relates to a communications apparatus enabled to using an active communication mode to support communications between NFC devices. The communications apparatus can include means for receiving a deselection request message from a remote NFC device that has established an active communication mode per communication link with a NFC device. Moreover, the communications apparatus can include means for changing the peer communication link to an asleep status while maintaining the peer communication link. In an aspect, the asleep status may prohibit communications between the NFC device and the remote NFC device.

Another aspect relates to a communications apparatus. The apparatus can include a transceiver, a memory, a processor coupled to the memory, and an active communication mode module coupled to at least one of the memory or processor. The active communication mode module may be configured to receive a deselection request message from a remote NFC device that has established an active communication mode per communication link with a NFC device. Moreover, the active communication mode module may further be configured to change the peer communication link to an asleep status while maintaining the peer communication link. In an aspect, the asleep status may prohibit communications between the NFC device and the remote NFC device.

Still another aspect relates to a computer program product, which can have a computer-readable medium including code for receiving a deselection request message from a remote NFC device that has established an active communication mode per communication link with a NFC device. Moreover, the computer-readable medium can include code for changing the peer communication link to an asleep status while maintaining the peer communication link. In an aspect, the asleep status may prohibit communications between the NFC device and the remote NFC device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, a device may recognize a NFC target device and/or tag when within range of the coverage area of the NFC device and/or tag. Thereafter, the device may obtain sufficient information to allow for communications to be established. One form of communications that may be established is a peer-to-peer communications link. As described herein, communications enabled over a peer-to-peer communications link may use a passive communications mode or active communications mode. In a passive communicate mode, each peer maintains its status as a polling device or a listening device for the entirety of the established link. In an active communicate mode, each peer device may alternate its status as a polling device and a listening device for the entirety of the established link.

Figure 1:
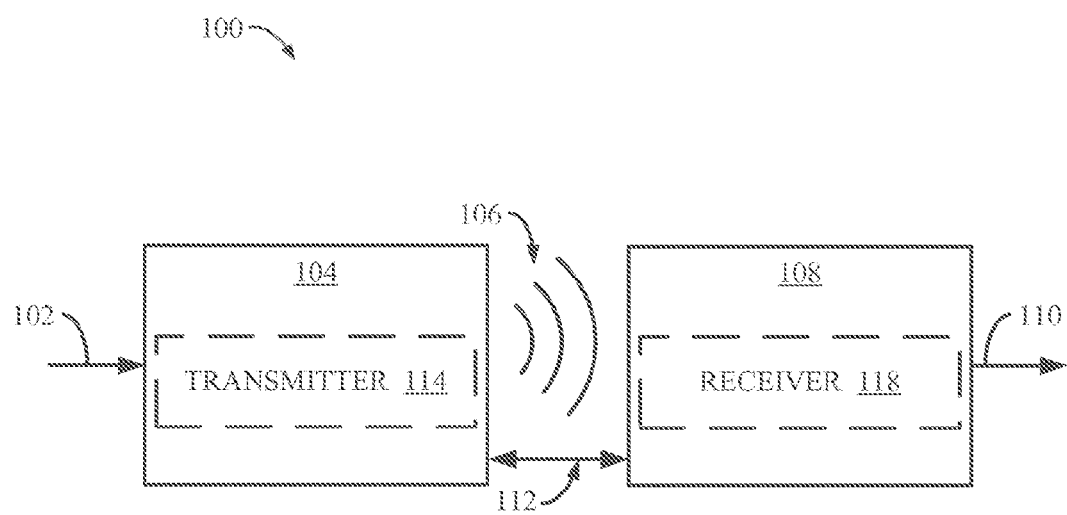
FIG. 1 is a block diagram of a wireless communication system, according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In an exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
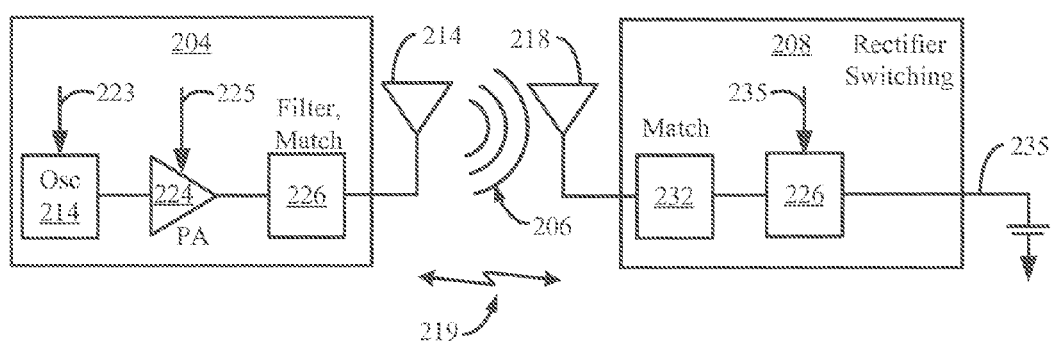
FIG. 2 is a schematic diagram of a wireless communication system, according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, Zigbee, cellular, etc).

Figure 3:
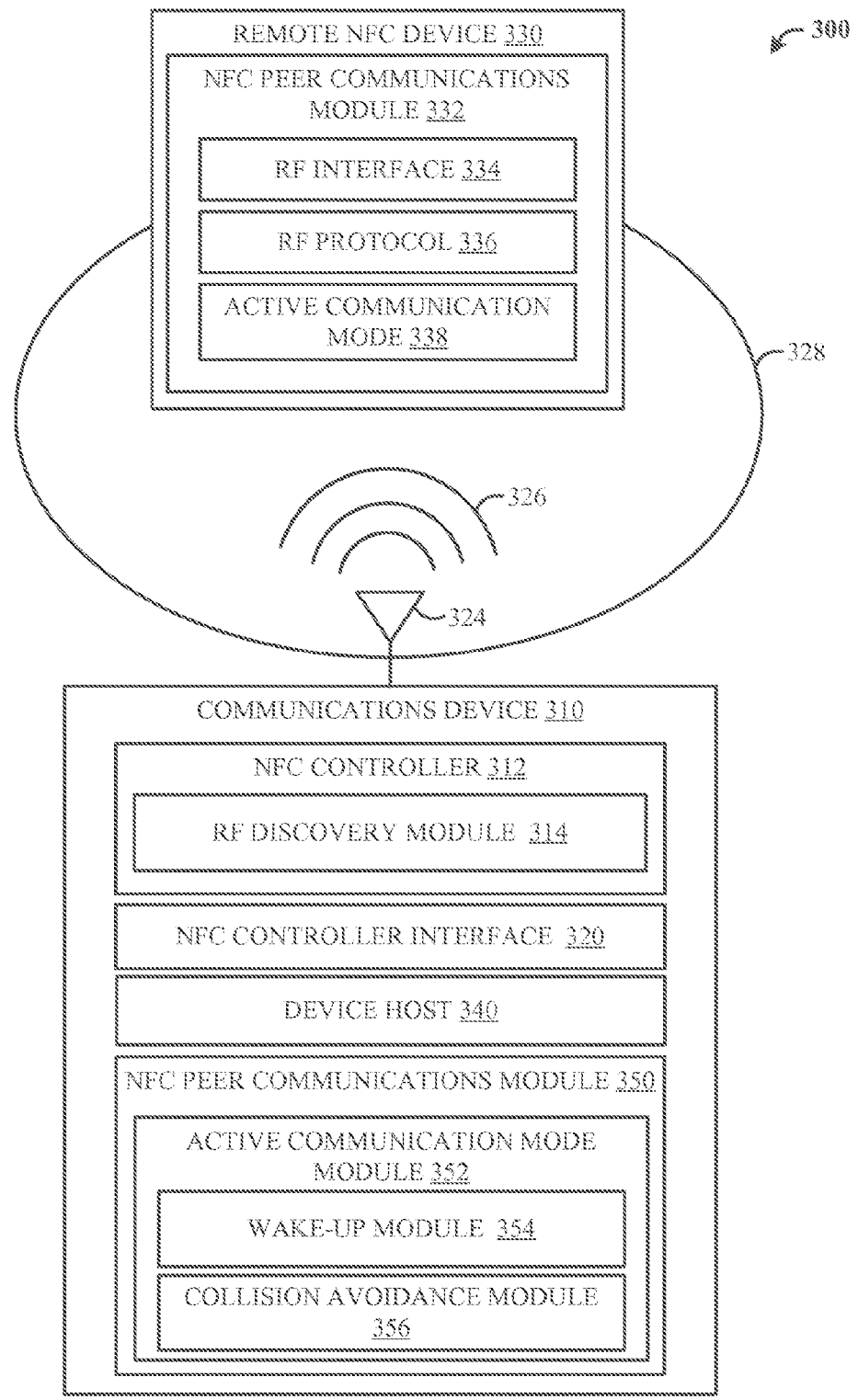
FIG. 3 is a block diagram of a NFC environment, according to an aspect.

With reference to FIG. 3, a block diagram of a communication network 300 according to an aspect is illustrated. Communication network 300 may include communications device 310 which, through antenna 324, may be in communication with a remote NFC device 330 within an operating volume 328 using one or more NFC technologies 326 (e.g., NFC-A, NFC-B, NFC-F, etc.). As used herein, an operating volume may include a volume within which an NFC device may detect the presence of a field generated by a remote NFC device and/or perform NFC based communications with the remote NFC device. In an aspect, remote NFC device 330 and/or communications device 310 may be configured to communicate through NFC peer-to-peer communication module 332 through one or more RF interfaces 334 using one or more RF protocols 336, in an active communication mode 338. In another aspect, communications device 310 may be configured to be connected to an access network and/or core network (e.g., a CDMA network, a GPRS network, a UMTS network, and other types of wireline and wireless communication networks). In an aspect, remote NFC device 330 may include but is not limited to a remote NFC tag, a reader/writer device, a peer initiator device, a remote peer target device, etc.

Communications device 310 may include NCI 320. In an aspect, NCI 320 may be configured to enable communications between a NFC enabled antenna and NFC controller 312. NCI 320 may be configured to function in a listening mode and/or a polling mode. During passive communication mode communications, whichever mode the communications device 310 begins peer communications as is the mode that the communications device 310 may remain for the duration of the peer communications. During active communication mode communications, communications device 310 may switch listening mode and polling mode responsibilities during a peer communications link.

Communications device 310 may include a NFC controller (NFCC) 312. In an aspect, NFCC 320 may include RF discovery module 314. RF discovery module 314 may be configured to perform RF discovery using a RF discovery loop as part of a discovery process to enable peer mode communications. DH 340 may be configured to generate a command to prompt NFCC 312 to perform various functions associated with RF discovery.

Communications device 310 may include NFC peer communications module 350. NFC peer communications module 350 may be configured to facilitate various modes of peer communications. In an aspect, NFC peer communications module 350 may be configured to facilitate passive communication mode peer communications. In another aspect, NFC peer communications module 350 may be configured to facilitate active communication mode peer communications using active communication mode module 352. In an aspect, since either a remote NFC device 330 or the communications device 310 may initiate communications while using an active communication mode, collision avoidance module 356 may be used to assure no collisions occur during generation of an operating field. Further, collision avoidance module 356 may assure no collisions occur during any subsequent communications. An example of a subsequent collision avoidance process is discussed with reference to FIG. 7. In an aspect, prior to each communication, an active communication mode flag (e.g., CON_POLL_ACTIVE_COMM) may be checked. Where the flag is set, collision avoidance module 356 may perform collision avoidance prior to communication of the message. In operation, initial RF collision avoidance may be performed one time by a device that is about to begin technology detection. Thereafter, subsequent RF collision avoidance may be performed by an initiating device (e.g., NFC-DEP Initiator) before every command, and by a target (e.g., NFC-DEP target) before every response. In an aspect, the initial and subsequent RF collisions avoidance commands may be defined as part of an enhanced Digital Protocol specification.

In an aspect, active communication mode module 352 may be configured to maintain a communications link after a communications device has been deselected. In such an aspect, the active communication mode module 352 may reactivate the communications link upon receive of a wake-up request (e.g., WUP_REQ) using wake-up module 354. In response to receiving a wake up request, a wake-up response (e.g., WUP_RES) may be sent to indicate successful receipt of the wake-up request. In an aspect, the wake-up commands (WUP_REQ and WUP_RES) may be defined as part of an enhanced Digital Protocol specification. In another aspect, the active communication mode module 352 may prohibit the communications device 310 from responding to any messages, other than a wakeup message, from a remote NFC device 330. In another aspect, communications device 310 may determine to deselect a remote NFC device 330 with which an active communication mode link has been established. In such an aspect, wake-up module 354 may prompt communications device 310 to transmit a wakeup request upon a determination to reactivate the communications link. By contrast, where a communications device 310 receives a deselection message while engaged in a passage communication mode, the communications device deselects the peer communication link and may deactivate the communication link as well.

Therefore, a system and method is disclosed to provide improved peer communications by using active mode communications between communications device 310 and remote NFC device 330.

FIGS. 4-7 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
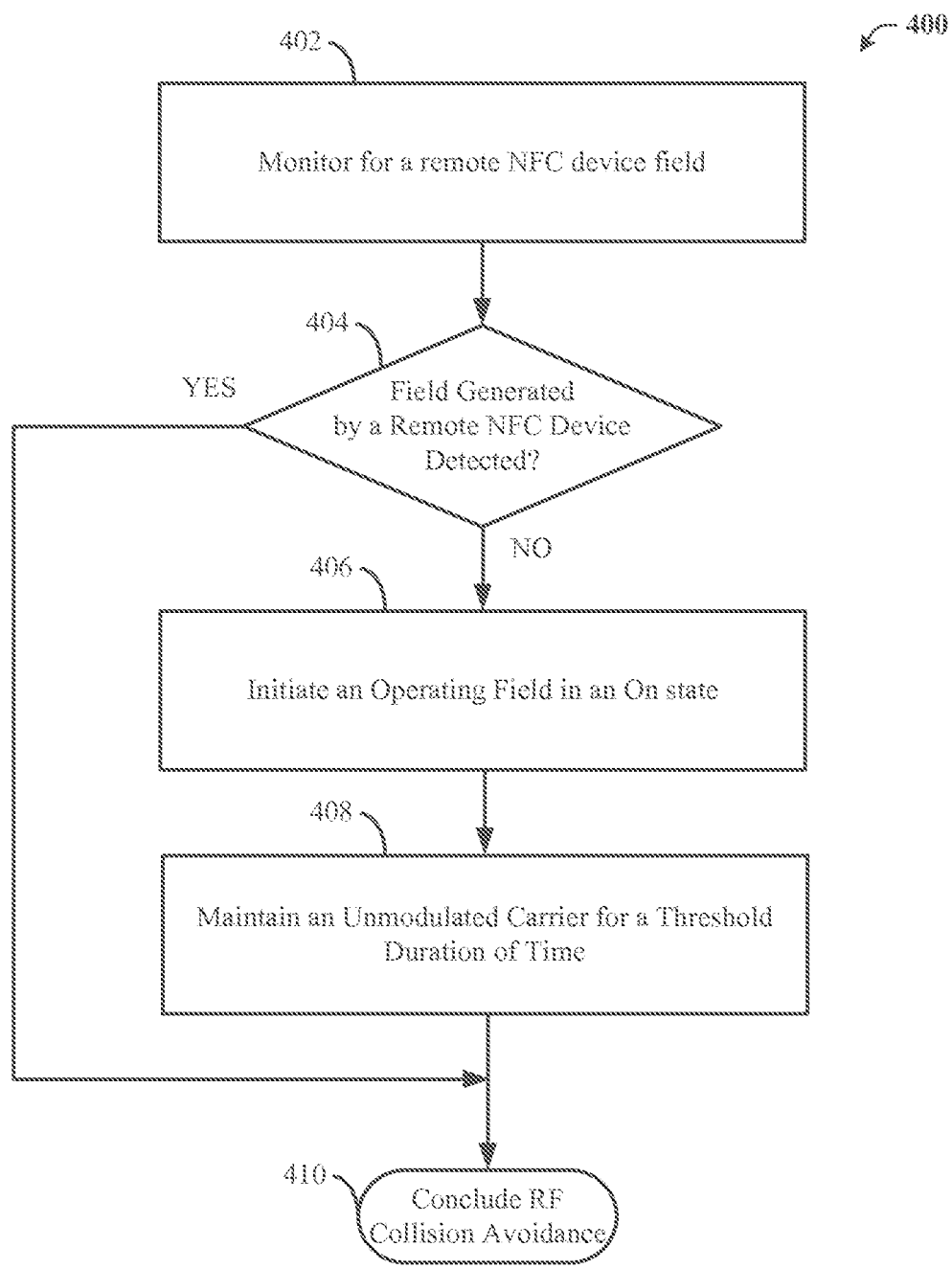
FIG. 4 is a flowchart describing an example of using active mode communication for peer communications in an NFC environment, according to an aspect.

FIG. 4 depicts an example flowchart describing a process 400 for performing collision avoidance as part of using an active communications mode.

At block 402, a NFC device may monitor an operating volume for the presence of any remote NFC devices. As used herein, an operating volume may include a volume within which an NFC device may detect the presence of a field generated by a remote NFC device and/or perform NFC based communications with the remote NFC device. In an aspect, the NFC device may monitor for a duration of time.

In such an aspect, the duration may be an active communications mode delay time ($T_{AD}$) plus a multiple of an RF waiting time ($T_{RFW}$).

At block 404, the NFC device may determine whether a field that may be generated by a remote NFC device is sensed in the operating volume. If at block 404, the NFC device detects any remote NFC device field in the operating volume, then the collision avoidance process may proceed to its conclusion at block 410.

By contrast, if at block 404, the NFC device does not detect any remote NFC device field within the operating volume, then at block 406, the NFC device may turn an Operating Field to the Operating Field On state.

At block 408, prior to concluding the collision avoidance process, the NFC device may maintain an unmodulated carrier for at least a defined duration of time. In an aspect, the defined duration of time may be an active radio frequency guard time ($T_{ARFG}$) as defined as part of an enhanced NFC Digital Protocol specification. Thereafter, at block 410, the collision avoidance process may terminate.

Figure 5:
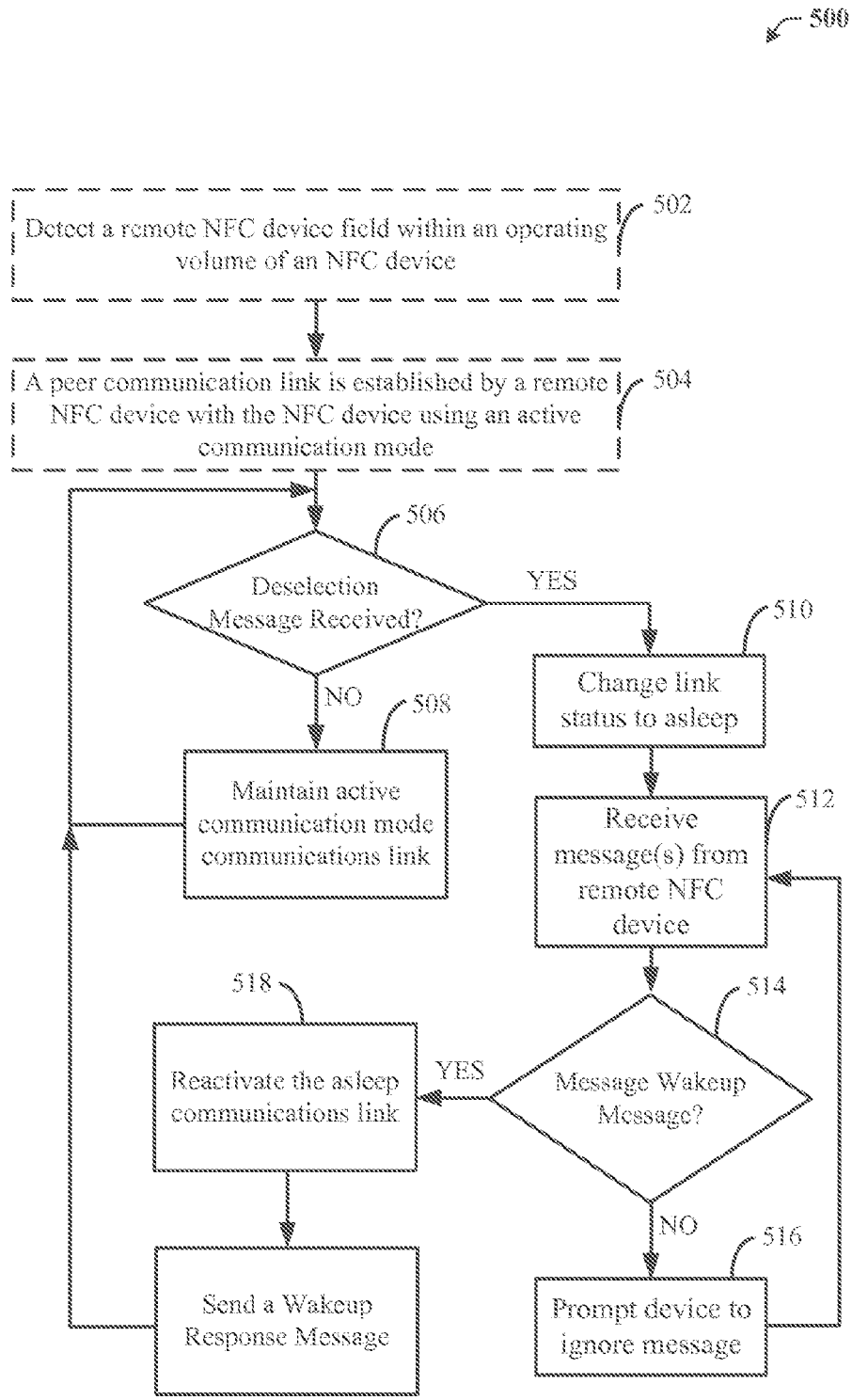
FIG. 5 is a flowchart describing another example of using active mode communication for peer communications in an NFC environment, according to an aspect.

FIG. 5 depicts an example flowchart describing another process 500 for improving peer communications by using an active communications mode.

In an optional aspect, at block 502, a NFC device may detect a field generated by a remote NFC device within an operating volume of an NFC device. As used herein, an operating volume may include a volume within which an NFC device may detect the presence of a field generated by a remote NFC device and/or perform NFC based communications with the remote NFC device.

Further, in an optional aspect, at block 504, the remote NFC device may establish a peer communication link with the NFC device using an active communication mode. In an aspect, the active communication mode may allow the NFC device and the remote NFC device to switch one or more responsibilities while maintaining the peer communication link. In such an aspect, one of the responsibilities may include a responsibility to modulate a RF carrier as part of the peer communication link. In an aspect, the remote NFC device may send an ATR_REQ indicating active communication mode is to be used. In an aspect, prior to transmitting the ATR_REQ message the remote NFC device may turn off an RF field and may wait at least an "off" timer duration (e.g., $t_{ACM,RFoff}$), then may turn on the RF field and may wait at least an "on" timer duration (e.g., $t_{ACM,RFon}$), and then may perform an initial RF collision avoidance process.

At block 506, the NFC device may determine whether it has received a deselection message. As used herein, a communication link that has been deselected may be kept in an inactive state (e.g., asleep). With active mode communications, a communications link may be deselected without be fully broken down. If at block 506, the NFC device determines that is has not received a deselection message, then at block 508 the NFC device may maintain the communication link with the remote NFC device using the active communications mode. Further, the NFC device may continue to monitor to determine whether a deselection message is received at block 506.

By contrast, if at block 506, the NFC device determines that it has received a deselection message, then at block 510, the NFC device may change the communications link status. For example, the link may be indicated as asleep, inactive, etc. Generally, once the remote NFC device puts the link to sleep it may activate, communicate with, and deselect or deactivate other devices as peer targets. In other words, the remote NFC device (e.g., peer initiator) that sends the deselection message can talk to peer target A, then put the link with peer target A to sleep, and then talk to peer target B. Further, peer initiator may subsequently put the link with peer target B to sleep (or deactivate it), and then wake up peer target A again. As used herein, this process is referred to as multi-activation.

At block 512, the NFC device may receive one or more messages while the communications link is asleep. At block 514, the NFC device determines whether any of the received messages is a wake-up request (WUP_REQ) message from the remote NFC device. If at block 514, the NFC device determines that the received message is not a wake-up message from the remote NFC device, then the process may return to block 516.

By contrast, if at block 514, the NFC device determines that the received message is a wake-up message, then at block 518, the NFC device may reactivate the communications link. In such an aspect, once an NFC device has received a wake-up request, the NFC device may ignore any subsequently received wake-up request messages.

Further, at block 520, the NFC device may send a wakeup response (WUP_RES) message to the remote NFC device indicating that the request was successfully processed. In an aspect, once the NFC device is reactivated it may perform communications with the remote NFC device and/or may continue to monitor to determine whether a deselection message is received at block 506.

Figure 6:
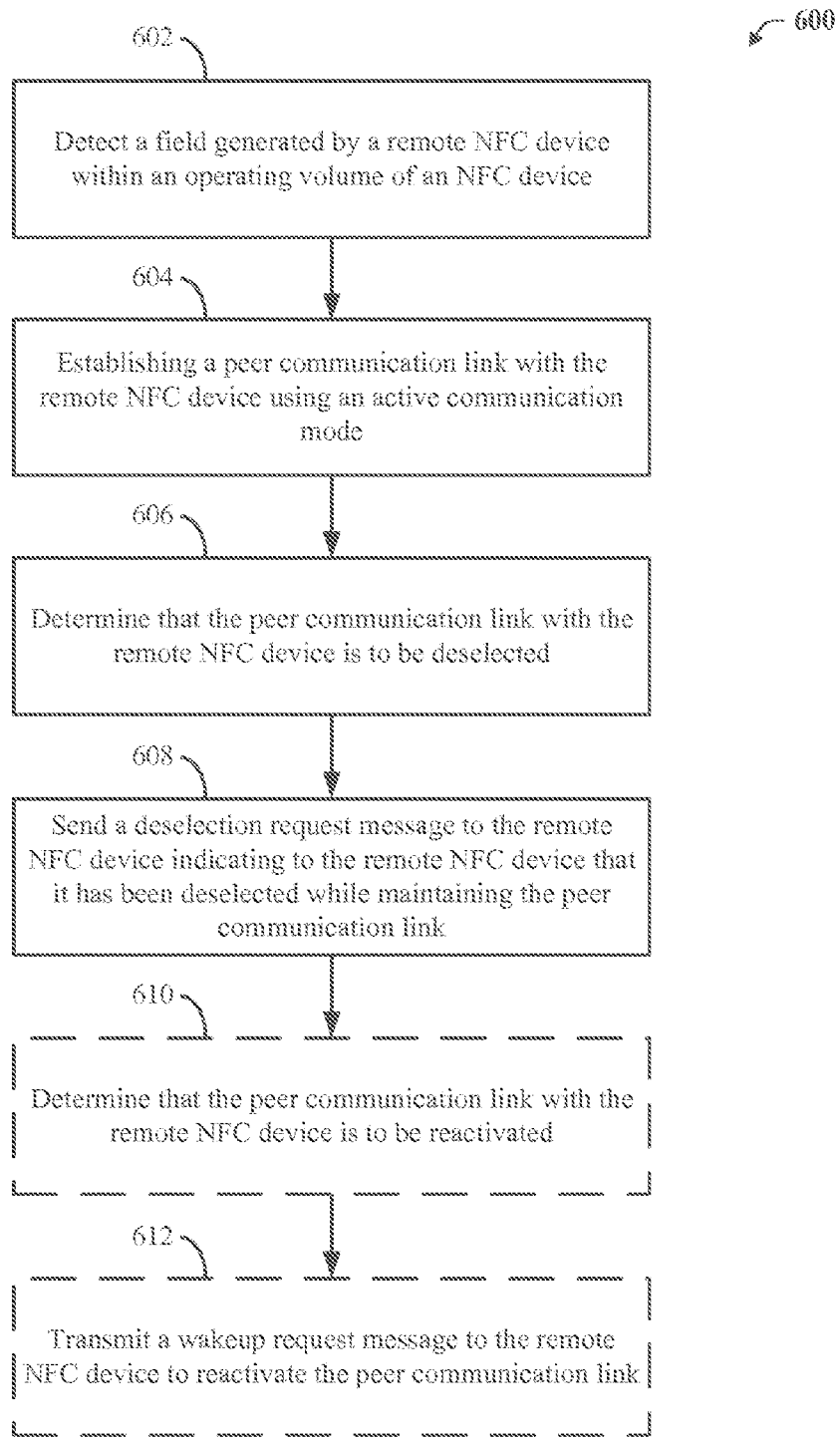
FIG. 6 is a flowchart describing another example of using active mode communication for peer communications in an NFC environment, according to an aspect.

FIG. 6 depicts an example flowchart describing another process 600 for improving peer communications by using an active communications mode. In an aspect, use of an active communication mode allows the NFC device and the remote NFC device to balance one or more power consumption responsibilities associated with maintaining the peer communication link. For example, the NFC device and remote NFC device may share responsibility to modulate a RF carrier as part of the peer communication link.

At block 602, a NFC device may detect a field generated by a remote NFC device with the operating volume of the NFC device. As used herein, an operating volume may include a volume within which an NFC device may detect the presence of a field generated by a remote NFC device and/or perform NFC based communications with the remote NFC device.

At block 604, the NFC device may establish a peer communication link with the remote NFC device using an active communication mode. In an aspect, establishment of the peer communication link may include turning off an RF field and waiting for a first time duration, turning on the RF field and waiting for a second time duration, and performing an initial RF collision avoidance process. In such an aspect, the first time duration may be an active communication module RF off time ($T_{ACM,RFoff}$), and the second time duration may be an active communication module RF on time ($T_{ACM,RFon}$) as defined as part of an enhanced NFC Digital Protocol specification.

At block 606, the NFC device may determine that the peer communication link with the remote NFC device is to be deselected. As part of active communication mode functionality, a remote NFC device may be deselected while maintaining the established peer communication link. In other words, the remote NFC device may be put to sleep while the peer communication link is still maintained.

At block 608, the NFC device may send a deselection request message to the remote NFC device. In an aspect, the deselection request message may prompt the remote NFC device to switch to a sleep mode, while still maintaining the peer communication link.

In an optional aspect, at block 610, the NFC device may determine, thereafter, that communications with the asleep remote NFC device are to be reactivated.

In another optional aspect, at block 612, the NFC device may transmit a wakeup request message to the asleep remote NFC device. In an aspect, as part of a reactivation process, the NFC device may perform collision resolution on one or more wakeup responses received in response to transmission of the wakeup request message. In such an aspect, the collision resolution may include an initial collision resolution procedure and a subsequent collision resolution procedure (e.g., as described further with respect to FIG. 7).

Figure 7:
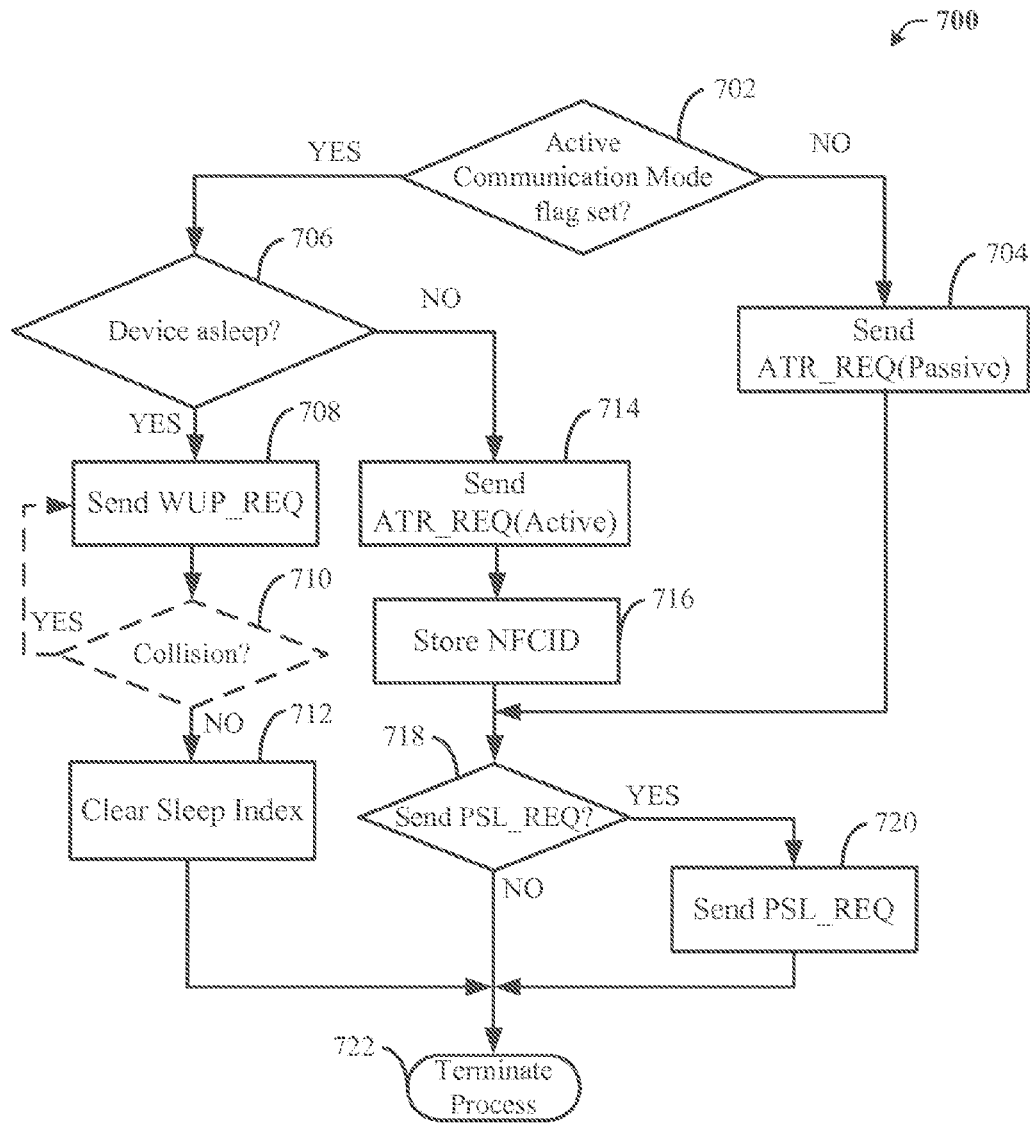
FIG. 7 illustrates a flowchart describing another example system for using active mode communication for peer communications in an NFC environment, according to an aspect.

FIG. 7 depicts an example flowchart describing another process 700 for improving peer communications by using an active communications mode as part of a device activation procedure.

Generally, before generating an Operating Field, an NFC device that is operating in an active communication mode performs RF Collision Avoidance. In operation, prior to sending a first technology detection command, an NFC device that is operating in a polling mode performs an initial RF Collision Avoidance. Additionally, during use of an active communication mode, before sending a command or response an NFC device, operating in either Poll or Listen Modes, performs subsequent RF collision avoidance.

At block 702, a NFC device may determine whether an active communication mode flag has been set. In an aspect, an active communication mode flag may include a CON_POLL_ACTIVE_COMM element with a value set to "1."

If at block 702, the NFC device determines that the active communication mode flag is not set, then at block 704, the NFC device may send a message to a remote NFC device without performing collision avoidance. In an aspect, no collision avoidance is used when the flag is not set because the polling NFC device is communicating using a passive communication mode and therefore no collisions will occur. In an aspect, the message sent by the NFC device may be an answer to reset request (ATR_REQ) indicating passive communication mode is being used.

By contrast, if at block 702, the NFC device determines that the active communication mode flag has been set, then at block 706, the NFC device determines whether an active communication mode communication link is currently asleep. In an aspect, a NFC device may be in a sleep mode (e.g., sleep sub-state) when a sleep index value is set.

If at block 706, the NFC device determines that a communications link is asleep, then at block 708, the NFC device may send a wakeup message (e.g., WUP_REQ). In an optional aspect that may depend on the type of RF technology is being used by the NFC device, at block 710, the NFC device may check for collisions between multiple received wakeup responses. In an aspect, the NFC device may check for collisions where NFC-F RF technology is being used. If at optional block 710 a collision is detected, then the process may return to block 708 for transmission of another wakeup request. At block 712, the NFC device may clear a sleep index value once the communications link has successfully been awaken.

By contrast, if at block 706, the NFC device determines that a communications link is not in a sleep mode, then at block 714, the NFC device may transmit a message. In an aspect, the message sent by the NFC device may be an ATR_REQ indicating active communication mode is being used. In an aspect, prior to transmitting the ATR_REQ message the NFC device may turn off an RF field and may wait at least an "off" timer duration (e.g., $t_{ACM,RFoff}$), then may turn on the RF field and may wait at least an "on" timer duration (e.g., $t_{ACM,RFon}$), and then may perform an initial RF collision avoidance process. At block 716, the NFC device replaces a value in an initiation identifier value (e.g., INT_NFCIDX[INT_INDEX]) with an NFCID (e.g., NFCID3) received in response (e.g., ATR_RES) to the ATR_REQ and resets a sleep index value (e.g., set INT_NFCIDX_SLEEP[INT_INDEX] to 0b).

At block 718, the NFC device may determine whether a parameter selection request (PSL_REQ) is to be sent to the remote NFC device. In an aspect, a PSL_REQ may be used to change the communication parameters such as bit rate before starting data exchange. If at block 718 the NFC device determines that the PSL REQ is to be sent, then at block 720 a PSL_REQ is sent to the remote NFC device. By contrast, if the NFC device determines that a PSL_REQ will not be sent, then the process may terminate at block 722.

Figure 8:
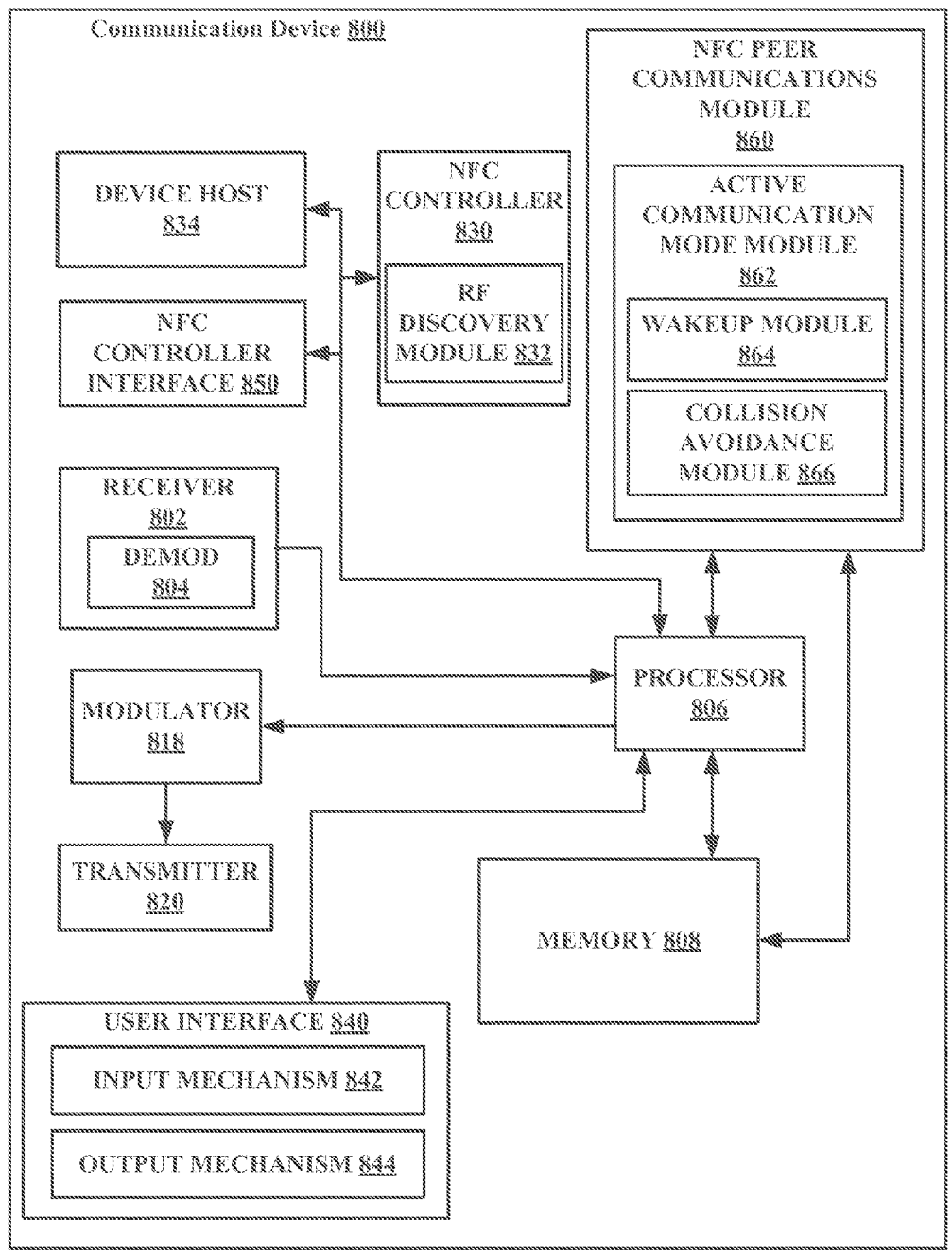
FIG. 8 illustrates a block diagram example architecture of a communications device, according to an aspect.

While referencing FIG. 3, but turning also now to FIG. 8, an example architecture of communications device 800 is illustrated. As depicted in FIG. 8, communications device 800 comprises receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to processor 806 for channel estimation. Processor 806 can be a processor dedicated to analyzing information received by receiver 802 and/or generating information for transmission by transmitter 820, a processor that controls one or more components of communications device 800, and/or a processor that both analyzes information received by receiver 802, generates information for transmission by transmitter 820, and controls one or more components of communications device 800. Further, signals may be prepared for transmission by transmitter 820 through modulator 818 which may modulate the signals processed by processor 806.

Communications device 800 can additionally comprise memory 808 that is operatively coupled to various components, such as but not limited processor 806 and that can store data to be transmitted, received data, information related to available channels, TCP flows, data associated with analyzed signal and/or interference strength, information related to an assigned channel, power, rate, or the like, and any other suitable information for assisting in NFC peer mode connection establishment.

Further, processor 806, device host 834, NFCC 830, and/or NFC peer communications module 860 can provide means for sensing an operating volume for a presence of a field generated by a remote NFC device as part of an active communication mode collision avoidance procedure, means for determining that no field is sensed within the operating volume of an NFC device, means for initiating an unmodulated carrier as part of switching an operating field for the NFC device to an on state, and means for maintaining the unmodulated carrier for a collision avoidance threshold duration of time. In another aspect, processor 806, device host 834, NFCC 830, and/or NFC peer communications module 860 can provide means for detecting a field generated by a remote NFC device within an operating volume of an NFC device, means for establishing a peer communication link with the remote NFC device using an active communication mode, means for determining that the peer communication link with the remote NFC device is to be deselected, and, means for transmitting a deselection request message to the remote NFC device indicating to the remote NFC device that it has been deselected while maintaining the peer communication link. In still another aspect, the processor 806, device host 834, NFCC 830, and/or NFC peer communications module 860 can provide means for receiving a deselection request message from a remote NFC device that has established an active communication mode per communication link with a NFC device, and means for changing the peer communication link to an asleep status while maintaining the peer communication link, wherein the asleep status prohibits communications between the NFC device and the remote NFC device.

It will be appreciated that data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 808 of the subject systems and methods may comprise, without being limited to, these and any other suitable types of memory.

Communications device 800 may include a NFC controller 830. In an aspect, NFCC 830 may include RF discovery module 832. RF discovery module 832 may be configured to perform RF discovery using a RF discovery loop (e.g., 810) as part of a discovery process to enable peer mode communications. DH 834 may be configured to generate a command to prompt NFCC 830 to perform various NFC actions, such as but not limited to, RF discovery, etc.

In another aspect, communications device 800 may include NCI 850. In an aspect, NCI 850 may be configured to enable communications between NFC controller 830 and DH 834. NCI 850 may be configured to function in a listening mode and/or a polling mode. During passive communication mode communications, whichever mode the communications device 800 begins peer communications as is the mode that the communications device 800 may remain for the duration of the peer communications. During active communication mode communications, communications device 800 may switch listening mode and polling mode responsibilities during a peer communications link.

In another aspect, communications device 800 may include NFC peer communications module 860. NFC peer communications module 860 may be configured to facilitate various modes of peer communications. In an aspect, NFC peer communications module 860 may be configured to facilitate passive communication mode peer communications. In another aspect, NFC peer communications module 860 may be configured to facilitate active communication mode peer communications using active communication mode module 862. In an aspect, since either a remote NFC device or the communications device 800 may initiate communications while using an active communication mode, collision avoidance module 866 may be used to assure no collisions occur during generation of an operating field. Further, collision avoidance module 866 may assure no collisions occur during any subsequent communications. An example of a subsequent collision avoidance process is discussed with reference to FIG. 7. In an aspect, prior to each communication, an active communication mode flag (e.g., CON_POLL_ACTIVE_COMM) may be checked. Where the flag is set, collision avoidance module 866 may perform collision avoidance prior to communication of the message. In an aspect, active communication mode module 862 may be configured to maintain a communications link after a communications device has been deselected. In such an aspect, the active communication mode module 862 may reactivate the communications link upon receive of a wake-up request (e.g., WUP_REQ) using wake-up module 864. In another aspect, the active communication mode module 862 may prohibit the communications device 800 from responding to any messages, other than a wakeup message, from a remote NFC device. In another aspect, communications device 800 may determine to deselect a remote NFC device with which an active communication mode link has been established. In such an aspect, wake-up module 864 may prompt communications device to transmit a wakeup request upon a determination to reactivate the communications link. By contrast, where a communications device 800 receives a deselection message while engaged in a passage communication mode, the communications device deselects the peer communication link and may deactivate the communication link as well.

In another aspect, active communication mode module 862 is configured to perform processes described with respect to FIGS. 4-7.

Additionally, communications device 800 may include user interface 840. User interface 840 may include input mechanisms 842 for generating inputs into communications device 800, and output mechanism 844 for generating information for consumption by the user of the communications device 800. For example, input mechanism 842 may include a mechanism such as a key or keyboard, a mouse, a touch-screen display, a microphone, etc. Further, for example, output mechanism 844 may include a display, an audio speaker, a haptic feedback mechanism, a Personal Area Network (PAN) transceiver etc. In the illustrated aspects, the output mechanism 844 may include a display configured to present media content that is in image or video format or an audio speaker to present media content that is in an audio format.

Figure 9:
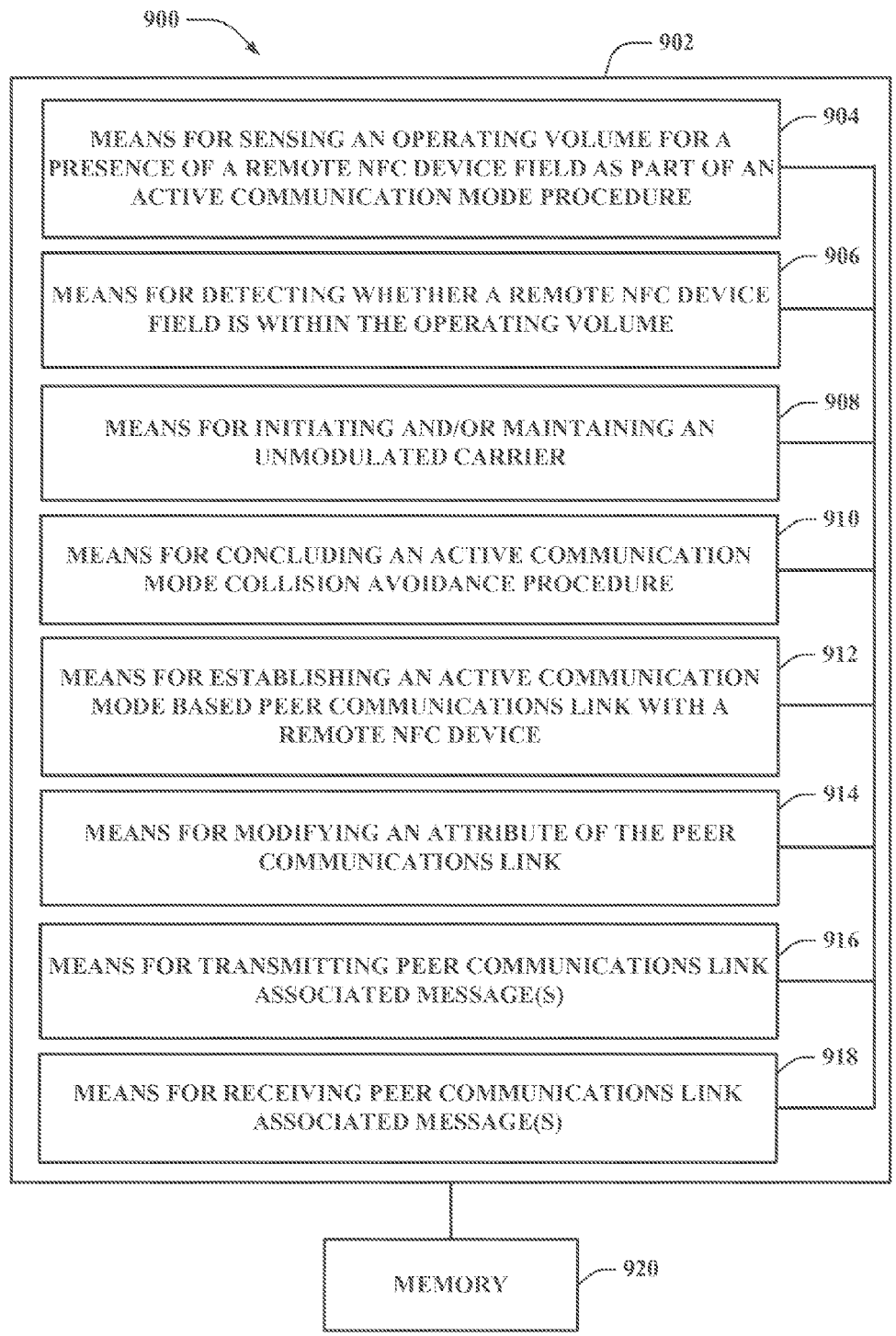
FIG. 9 is a functional block diagram of an example communication system for using active mode communication for peer communications in an NFC environment, according to an aspect.

FIG. 9 depicts another depicts a block diagram of an exemplary communication system 900 configured to improve peer communications through use of an active communication mode, according to an aspect. For example, system 900 can reside at least partially within a communications device (e.g., communications device 800). It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction.

For instance, in an aspect, logical grouping 902 can include an electrical component that may provide means for sensing an operating volume for a presence of a field generated by a remote NFC device as part of an active communication mode procedure 904. For example, in an aspect, the means for sensing 904 can include receiver 802, DH 834, NFCC 830, active communication mode module 862, and/or processor 806 of communications device 800. In an aspect, the means for sensing 904 may be configured to sense an operating volume for a presence of a field generated by a remote NFC device field as part of an active communication mode collision avoidance procedure.

Further, logical grouping 902 can include an electrical component that may provide means for detecting whether a remote NFC device field is within the operating volume 906. For example, in an aspect, the means for determining 906 can include receiver 802, DH 834, NFCC 830, active communication mode module 862, and/or processor 806 of communications device 800. In an aspect, the means for detecting 906 may be configured to determine that no field is sensed within the operating volume of an NFC device. In an aspect, the means for detecting 906 may be configured to detect a field generated by a remote NFC device within an operating volume of an NFC device.

Further, logical grouping 902 can include an electrical component that may provide means for initiating and/or maintaining an unmodulated carrier 908. For example, in an aspect, the means for initiating 908 can include transmitter 820, DH 834, NFCC 830, active communication mode module 862, and/or processor 806 of communications device 800. In an aspect, the means for initiating and/or maintaining 908 may be configured to initiate an unmodulated carrier as part of switching an operating field for the NFC device to an on state. In an aspect, the means for initiating and/or maintaining 908 may be configured to maintain the unmodulated carrier for a collision avoidance threshold duration of time. In such an aspect, the collision avoidance threshold may be an active radio frequency guard time ($T_{ARFG}$).

In another aspect, logical grouping 902 can include an electrical component that may provide means for concluding an active communication mode collision avoidance procedure 910. For example, in an aspect, the means for concluding an active communication mode collision avoidance procedure 910 can include DH 834, NFCC 830, active communication mode module 862, and/or processor 806 of communications device 800. In an aspect, the means for concluding an active communication mode collision avoidance procedure 910 may be configured to conclude the active communication mode collision avoidance procedure upon a determination that the collision avoidance threshold duration of time has elapsed. In such an aspect, the collision avoidance threshold may be a duration between switching on the unmodulated carrier and starting to send a command.

In another aspect, logical grouping 902 can include an electrical component that may provide means for establishing an active communication mode based peer communications link with a remote NFC device 912. For example, in an aspect, the means for establishing an active communication mode based peer communications link 912 can include DH 834, NFCC 830, active communication mode module 862, and/or processor 806 of communications device 800. In an aspect, the means for establishing an active communication mode based peer communications link 912 may be configured to establish a peer communication link with the remote NFC device using an active communication mode. In an aspect, the means for establishing an active communication mode based peer communications link 912 may be configured to turn off a RF field and waiting for a first time duration, turn on the RF field and waiting for a second time duration, and perform an initial RF collision avoidance process. In such an aspect, the first time duration may be an active communication module RF off time ($T_{ACM,RFoff}$), and the second time duration may be an active communication module RF on time ($T_{ACM,RFon}$).

In another aspect, logical grouping 902 can include an electrical component that may provide means for modifying an attribute of the peer communications link 914. For example, in an aspect, the means for concluding an active communication mode collision avoidance procedure 914 can include DH 834, NFCC 830, active communication mode module 862, and/or processor 806 of communications device 800. In an aspect, the means for modifying 914 may be configured to determine that the peer communication link with the remote NFC device is to be deselected. In an aspect, the means for modifying 914 may be configured to determine that the peer communication link with the remote NFC device is to be reactivated. In an aspect where NFC type-F RF technology is used to enable communications, the means for modifying 914 may be configured to perform collision resolution prior to transmitting a message over the peer communication link. In such an aspect, the collision resolution may include an initial collision resolution procedure and a subsequent collision resolution procedure. In an aspect, the means for modifying 914 may be configured to change the peer communication link to an asleep status while maintaining the peer communication link. In such an aspect, the asleep status may prohibit communications between the NFC device and the remote NFC device. In an aspect, the means for modifying 914 may be configured to change the peer communication link to an awake status. In an aspect, the means for modifying 914 may be configured to ignore any wake up request messages received after reception of the first wake up request message. In an aspect, the means for modifying 914 may be configured to determine that none of the received one or more messages are a wakeup message, and prohibit the NFC device from processing any of the one or more received messages.

In another aspect, logical grouping 902 can include an electrical component that may provide means for transmitting one or more peer communications link associated messages 916. For example, in an aspect, the means for transmitting 916 can include transmitter 820, DH 834, NFCC 830, active communication mode module 862, and/or processor 806 of communications device 800. In an aspect, the means for transmitting 916 may be configured to transmit a deselection request message to the remote NFC device indicating to the remote NFC device that it has been deselected while maintaining the peer communication link. In an aspect, the means for transmitting 916 may be configured to transmit a wakeup request message to the remote NFC device to reactivate the peer communication link. In an aspect, the means for transmitting 916 may be configured to transmit a wakeup response to the remote NFC device.

In another aspect, logical grouping 902 can include an electrical component that may provide means for receiving one or more peer communications link associated messages 918. For example, in an aspect, the means for receiving 918 can include receiver 802, DH 834, NFCC 830, active communication mode module 862, and/or processor 806 of communications device 800. In an aspect, the means for receiving 918 may be configured to receive a deselection request message from a remote near field communication (NFC) device that has established an active communication mode per communication link with a NFC device. In an aspect, the means for receiving 918 may be configured to receive a first wake up request message from the remote NFC device. In an aspect, the means for receiving 918 may be configured to receive one or more messages from the remote NFC device while in the asleep status.

Additionally, system 900 can include a memory 920 that retains instructions for executing functions associated with the electrical components 904, 906, 908, 910, 912, 914, 916, and 918, stores data used or obtained by the electrical components 904, 906, 908, 910, 912, 914, 916, 918, etc. While shown as being external to memory 920, it is to be understood that one or more of the electrical components 904, 906, 908, 910, 912, 914, 916, and 918 may exist within memory 920. In one example, electrical components 904, 906, 908, 910, 912, 914, 916, and 918 can include at least one processor, or each electrical component 904, 906, 908, 910, 912, 914, 916, and 918 can be a corresponding module of at least one processor. Moreover, in an additional or alternative example, electrical components 904, 906, 908, 910, 912, 914, 916, and 918 may be a computer program product including a computer readable medium, where each electrical component 904, 906, 908, 910, 912, 914, 916, and 918 may be corresponding code. In an aspect, for example, memory 920 may be the same as or similar to memory 808 (FIG. 8). In another aspect, memory 920 may be associated with DH 834, NFCC 830, and/or active communication mode module 862.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-F, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
    detecting a field generated by a remote near field communication (NFC) device within an operating volume of an NFC device;
    establishing a peer communication link with the remote NFC device using an active communication mode, wherein the peer communication link is deselected after being established while being maintained;
    determining that the peer communication link with the remote NFC device is to be reactivated;
    transmitting a wakeup request message to the remote NFC device to reactivate the peer communication link; and
    performing a radio frequency (RF) collision avoidance process on one or more wakeup responses received from the remote NFC device in response to transmission of the wakeup request message, wherein the performing the RF collision avoidance process further comprises:
        determining whether an active communication mode flag has been set; and
        transmitting a message to the remote NFC device without performing the RF collision avoidance process before the transmitting message based on a determination that the active communication mode flag has not been set.

2. The method of claim 1, wherein the NFC device and the remote NFC device are configured to use NFC type-F RF technology, and wherein the determining that the peer communication link with the remote NFC device is to be reactivated further comprises:
    performing collision resolution prior to transmitting a message over the peer communication link.

3. The method of claim 2, wherein the collision resolution includes at least one of an initial collision resolution procedure and a subsequent collision resolution procedure.

4. The method of claim 1, wherein establishing the peer communication link with the remote NFC device, further comprises:
    turning off a RF field and waiting for a first time duration;
    turning on the RF field and waiting for a second time duration; and
    performing an initial RF collision avoidance process.

5. The method of claim 4, wherein the first time duration is an active communication module RF off time (TACM, RFoff) as defined as part of an enhanced NFC Digital Protocol specification, and the second time duration is an active communication module RF on time (TACM,RFon) as defined as part of the enhanced NFC Digital Protocol specification.

6. The method of claim 1, wherein the active communication mode allows the NFC device and the remote NFC device to balance one or more power consumption responsibilities associated with maintaining the peer communication link.

7. The method of claim 6, wherein one of the one or more power consumption responsibilities include a responsibility to modulate a RF carrier as part of the peer communication link.

8. A non-transitory computer-readable medium comprising code executable by a processor for:
    detecting a field generated by a remote near field communication (NFC) device within an operating volume of an NFC device;
    establishing a peer communication link with the remote NFC device using an active communication mode, wherein the peer communication link is deselected after being established while being maintained;
    determining that the peer communication link with the remote NFC device is to be reactivated;
    transmitting a wakeup request message to the remote NFC device to reactivate the peer communication link; and
    performing a radio frequency (RF) collision avoidance process on one or more wakeup responses received from the remote NFC device in response to transmission of the wakeup request message, wherein the performing the RF collision avoidance process further comprises:
        determining whether an active communication mode flag has been set; and
        transmitting a message to the remote NFC device without performing the RF collision avoidance process before the transmitting message based on a determination that the active communication mode flag has not been set.

9. The non-transitory computer-readable medium of claim 8, wherein the NFC device and the remote NFC device are configured to use NFC type-F RF technology, and wherein the computer-readable medium further comprises code for:
performing collision resolution prior to transmitting a message over the peer communication link.

10. The non-transitory computer-readable medium of claim 9, wherein the collision resolution includes at least one of an initial collision resolution procedure and a subsequent collision resolution procedure.

11. The non-transitory computer-readable medium of claim 8, further comprising code for:
turning off a RF field and waiting for a first time duration;
turning on the RF field and waiting for a second time duration; and
performing an initial RF collision avoidance process.

12. The non-transitory computer-readable medium of claim 11, wherein the first time duration is an active communication module RF off time (TACM,RFoff) as defined as part of an enhanced NFC Digital Protocol specification, and the second time duration is an active communication module RF on time (TACM,RFon) as defined as part of the enhanced NFC Digital Protocol specification.

13. The non-transitory computer-readable medium of claim 8, wherein the active communication mode allows the NFC device and the remote NFC device to balance one or more power consumption responsibilities associated with maintaining the peer communication link.

14. The computer-readable medium of claim 13, wherein one of the one or more power consumption responsibilities include a responsibility to modulate a RF carrier as part of the peer communication link.

15. An apparatus for communications, comprising:
means for detecting a field generated remote near field communication (NFC) device within an operating volume of an NFC device;
means for establishing a peer communication link with the remote NFC device using an active communication mode, wherein the peer communication link is deselected after being established while being maintained;
means for determining that the peer communication link with the remote NFC device is to be reactivated;
means for transmitting a wakeup request message to the remote NFC device to reactivate the peer communication link; and
means for performing a radio frequency (RF) collision avoidance process on one or more wakeup responses received from the remote NFC device in response to transmission of the wakeup request message, wherein the means for performing the RF collision avoidance process further comprises:
means for determining whether an active communication mode flag has been set and
means for transmitting a message to the remote NFC device without performing the RF collision avoidance process before the transmitting message based on a determination that the active communication mode flag has not been set.

16. The apparatus of claim 15, wherein the NFC device and the remote NFC device are configured to use NFC type-F RF technology, and wherein the means for determining is further configured to:
perform collision resolution prior to transmitting a message over the peer communication link.

17. The apparatus of claim 16, wherein the collision resolution includes at least one of an initial collision resolution procedure and a subsequent collision resolution procedure.

18. The apparatus of claim 15, wherein the means for establishing the peer communication link with the remote NFC device is further configured to:
turn off a RF field and waiting for a first time duration;
turn on the RF field and waiting for a second time duration; and
perform an initial RF collision avoidance process.

19. The apparatus of claim 18, wherein the first time duration is an active communication module RF off time (TACM,RFoff) as defined as part of an enhanced NFC Digital Protocol specification, and the second time duration is an active communication module RF on time (TACM, RFon) as defined as part of the enhanced NFC Digital Protocol specification.

20. The apparatus of claim 15, wherein the active communication mode allows the NFC device and the remote NFC device to balance one or more power consumption responsibilities associated with maintaining the peer communication link.

21. The apparatus of claim 20, wherein one of the one or more power consumption responsibilities include a responsibility to modulate a RF carrier as part of the peer communication link.

22. An apparatus for NFC communications, comprising:
a transceiver;
a memory;
a processor coupled to the memory; and
an active communication mode module coupled to at least one of the memory or the processor and configured to:
detect a field generated by a remote near field communication (NFC) device within an operating volume of an NFC device;
establish a peer communication link with the remote NFC device using an active communication mode, wherein the peer communication link is deselected after being established while being maintained;
wherein the active communication mode module is further configured to determine that the peer communication link with the remote NFC device is to be reactivated;
wherein the transceiver is further configured to transmit a wakeup request message to the remote NFC device to reactivate the peer communication link; and
wherein the active communication mode module is further configured to a radio frequency (RF) collision avoidance process on one or more wakeup responses received from the remote NFC device in response to transmission of the wakeup request message, wherein the performing the RF collision avoidance process further:
determines whether an active communication mode flag has been set; and
transmits a message to the remote NFC device without performing the RF collision avoidance process before the transmitting message based on a determination that the active communication mode flag has not been set.

23. The apparatus of claim 22, wherein the NFC device and the remote NFC device are configured to use NFC type-F RF technology, and wherein the active communication mode module is further configured to:
perform collision resolution prior to transmitting a message over the peer communication link.

24. The apparatus of claim 23, wherein the collision resolution includes at least one of an initial collision resolution procedure and a subsequent collision resolution procedure.

25. The apparatus of claim 22, wherein the active communication mode module is further configured to:
- turn off a RF field and waiting for a first time duration;
- turn on the RF field and waiting for a second time duration; and
- perform an initial RF collision avoidance process.

26. The apparatus of claim 25, wherein the first time duration is an active communication module RF off time (TACM,RFoff) as defined as part of an enhanced NFC Digital Protocol specification, and the second time duration is an active communication module RF on time (TACM, RFon) as defined as part of the enhanced NFC Digital Protocol specification.

27. The apparatus of claim 22, wherein the active communication mode allows the NFC device and the remote NFC device to balance one or more power consumption responsibilities associated with maintaining the peer communication link.

28. The apparatus of claim 27, wherein one of the one or more power consumption responsibilities include a responsibility to modulate a RF carrier as part of the peer communication link.

* * * * *